United States Patent [19]
Bailey et al.

[11] Patent Number: 5,575,835
[45] Date of Patent: Nov. 19, 1996

[54] APPARATUS FOR REMOVING MOISTURE FROM AN ENVIRONMENT

[75] Inventors: Christian E. Bailey, Port Deposit; Thomas E. Finan, Silver Spring, both of Md.

[73] Assignee: W. L. Gore & Associates, Inc., Newark, Del.

[21] Appl. No.: 514,125

[22] Filed: Aug. 11, 1995

[51] Int. Cl.$^6$ .................................................. B01D 53/22
[52] U.S. Cl. ..................... 96/7; 55/269; 95/52; 62/324.1
[58] Field of Search ...................... 55/267, 269; 62/324.1; 95/43–45, 52; 96/4, 5, 7

[56] References Cited

U.S. PATENT DOCUMENTS

| | | | |
|---|---|---|---|
| 1,738,720 | 12/1929 | Munters et al. | 96/4 X |
| 1,881,490 | 10/1932 | Gmelin et al. | 95/43 |
| 2,433,741 | 12/1947 | Crawford | 95/52 |
| 2,506,656 | 5/1950 | Wallach et al. | 95/52 |
| 3,248,861 | 5/1966 | Lovercheck | 55/281 |
| 3,447,286 | 6/1969 | Dounoucos | 95/44 |
| 3,488,971 | 1/1970 | Meckler | 62/3 |
| 3,676,220 | 7/1972 | Ward III | 96/5 X |
| 3,911,080 | 10/1975 | Mehl et al. | 95/45 X |
| 3,953,566 | 4/1976 | Gore | 264/288 |
| 4,110,392 | 8/1978 | Yamazaki | 264/127 |
| 4,187,390 | 2/1980 | Gore | 55/486 X |
| 4,430,864 | 2/1984 | Mathiprakasam | 62/324.1 X |
| 4,528,078 | 7/1985 | Hirschfeld | 204/129 |
| 4,749,388 | 6/1988 | Francois | 55/221 |
| 4,750,918 | 6/1988 | Sirkar | 95/44 |
| 4,862,730 | 9/1989 | Crosby | 73/38 |
| 4,900,448 | 2/1990 | Bonne et al. | 95/52 X |
| 4,909,810 | 3/1990 | Nakao et al. | 95/52 |
| 4,913,818 | 4/1990 | Van Wijk et al. | 95/52 X |
| 4,915,838 | 4/1990 | Bonne et al. | 95/52 X |
| 5,002,590 | 3/1991 | Friesen et al. | 95/52 |
| 5,108,464 | 4/1992 | Friesen et al. | 95/52 |
| 5,236,474 | 8/1993 | Schofield et al. | 95/52 X |
| 5,281,254 | 1/1994 | Birbara et al. | 95/44 |

FOREIGN PATENT DOCUMENTS

| | | | |
|---|---|---|---|
| 0308002 | 3/1989 | European Pat. Off. | 95/52 |
| 2446871 | 5/1976 | Germany | 62/324.1 |
| 53-007578 | 1/1978 | Japan | 95/45 |
| 61-129019 | 6/1986 | Japan | 96/4 |
| 1-099631 | 4/1989 | Japan | 96/4 |
| 1-148307 | 6/1989 | Japan | 96/4 |
| 1-297122 | 11/1989 | Japan | 96/5 |
| 4-187218 | 7/1992 | Japan | 95/52 |
| 6-007630 | 1/1994 | Japan | 95/52 |
| 6-106021 | 4/1994 | Japan | 95/52 |
| 6-257805 | 9/1994 | Japan | 62/324.1 |
| 0776641 | 6/1957 | United Kingdom | 96/5 |
| 2126706 | 3/1984 | United Kingdom | 62/324.1 |
| 2214103 | 8/1989 | United Kingdom | 95/52 |
| 2280744 | 2/1995 | United Kingdom | 62/324.1 |
| WO91/15284 | 10/1991 | WIPO | 95/52 |

OTHER PUBLICATIONS

M. Kayashima, *J. Appl. Phys.* 49(9) Sep. 1978, pp. 4683–4687 "The Principle of the Thermal–Diffusion Couple and Its Application to Gas Compression and Decompression with Highly Porous Materials".

*Primary Examiner*—Robert Spitzer
*Attorney, Agent, or Firm*—Victor M. Genco, Jr.

[57] ABSTRACT

An electrically powered dehumidifier is provided which has no moving mechanical parts. The dehumidifier employs convection of a deliquescent solution around a fluid circuit having vapor permeable windows. The apparatus is driven by a solid state electronic heat pump, such as a Peltier effect solid-state heat pump, for example.

14 Claims, 5 Drawing Sheets

APPARATUS FOR REMOVING MOISTURE FROM AN ENVIRONMENT

FIELD OF THE INVENTION

This invention generally relates to an apparatus for removing moisture from an environment. More particularly, the present invention relates to an improved dehumidifier apparatus having no moving parts.

BACKGROUND OF THE INVENTION

Humidity, or water vapor in air, is often undesired in an environment. Generally, humidity may interfere with the storage of sensitive materials or the operation of delicate equipment within the environment. Methods exist for dehumidifying an environment, however, typically known dehumidification methods are bulky and ill-suited for operation in confined or limited spaces.

One such known method for dehumidifying an environment comprises the use of mechanical refrigeration equipment. In this type of dehumidification process, air is cooled to a predetermined temperature, below its dew point, where water vapor condenses out of the air and may be drained away. Thereafter, air may be reheated to a predetermined warmer temperature. Although this type of dehumidification method may be effective in use, such a method requires a compressor, fans for both hot and cold coils, and a plumbing system for collecting and separating liquid water from the air stream. Of course, all of these components are bulky.

Humidity may also be reduced by exposing air to a sorbent material, such as silica gel for example. In continuously operating systems, such a sorbent material would be cycled between sorption of water from the controlled environment and desorption of water by exposure to external heat in another atmosphere. However, this requires a supporting control system comprised of valves and fans, for example, to cycle the material between two states. Such a supporting control system is also bulky.

It is also known that humidity may be reduced by exposing air to a cooled water solution of a deliquescent solution, such as a solution of lithium chloride. At a predetermined cooled temperature, such a solution absorbs moisture from air. Thereafter, the solution can be cycled between this sorption stage and a desorption stage, wherein heated solution is exposed to another atmosphere. Solution cycling may be accomplished by mechanically pumping the solution around a fluid circuit comprising: 1) a spray or contractor tower region, wherein cool solution that is exposed to a volume of environmental air absorbs moisture from it; 2) a heat exchange region, wherein the solution is heated; 3) another spray or contacton tower region, wherein the warm solution that is exposed to a volume of external air desorbs moisture to it; and 4) another heat exchange region wherein the solution is cooled. However, in addition to a refrigeration system, this type of dehumidification method requires a pumping system to circulate the solution past the two air contacting regions of the circuit. Moreover, because the liquid solution directly contacts the air, a regulation system is required to confine the solution to the system, and to prevent its loss. A suitable regulation system may comprise open containers having liquid level sensing controls. In addition to the foregoing shortcomings, direct contact with air allows particulate contaminants from the air to enter and foul the solution. As may be appreciated, these shortcomings severely limit dehumidification operations by deliquescent solution.

The foregoing illustrates limitations known to exist in present apparatus for dehumidifying an environment. Thus, it is apparent that it would be advantageous to provide an improved dehumidifier directed to overcoming one or more of the limitations set forth above. Accordingly, a suitable alternative is provided including features more fully disclosed hereinafter.

SUMMARY OF THE INVENTION

The present invention advances the art of dehumidification apparatus beyond which is known to date. In one aspect of the present invention, an apparatus is provided for removing moisture from an enclosed environment. The enclosed environment has a predetermined internal atmosphere. A predetermined external atmosphere surrounds the enclosed environment. The apparatus comprises a solid state heat pump having opposed first and second surfaces. The first surface has a predetermined temperature which is greater than a predetermined temperature of the second surface. A support structure mounts the solid state heat pump. The support structure defines first and second cavities. The solid state heat pump is mounted in the support structure such that the first heat pump surface thermally communicates with the first cavity and the second heat pump surface thermally communicates with the second cavity. The support structure has formed therein at least two passages which fluidly connect the first and second cavities. The cavities and passages form a vertical fluid circuit, wherein the first passage is disposed at a predetermined higher location than the second passage. A deliquescent solution fills the first and second cavities. First and second liquid water impermeable, water vapor permeable membranes are attached to the support structure in liquid sealing relation to the first and second cavities, respectively. The first membrane permits the deliquescent solution in the first cavity to desorb water vapor to the external atmosphere, and the second membrane permits the deliquescent solution in the second cavity to adsorb water vapor from the internal atmosphere of the enclosed environment.

It is, therefore, a purpose of the present invention to provide for the dehumidification of an environment by a deliquescent solution cycle.

It is another purpose of the present invention to contain and control a deliquescent solution within a system constructed in part of a liquid water impermeable, but water vapor permeable, membrane.

It is yet another object of the present invention to replace the mechanical pumping systems of prior art deliquescent solution dehumidifiers.

It is a further object of the present invention to provide for refrigeration and heating of the deliquescent solution by a Peltier effect solid-state heat pump.

It is yet another object of the present invention to provide a dehumidifier which is subject to substantially no wear, vibration, noise, and which has no moving mechanical parts, and which may be packaged in a miniature form.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

Figure 1:
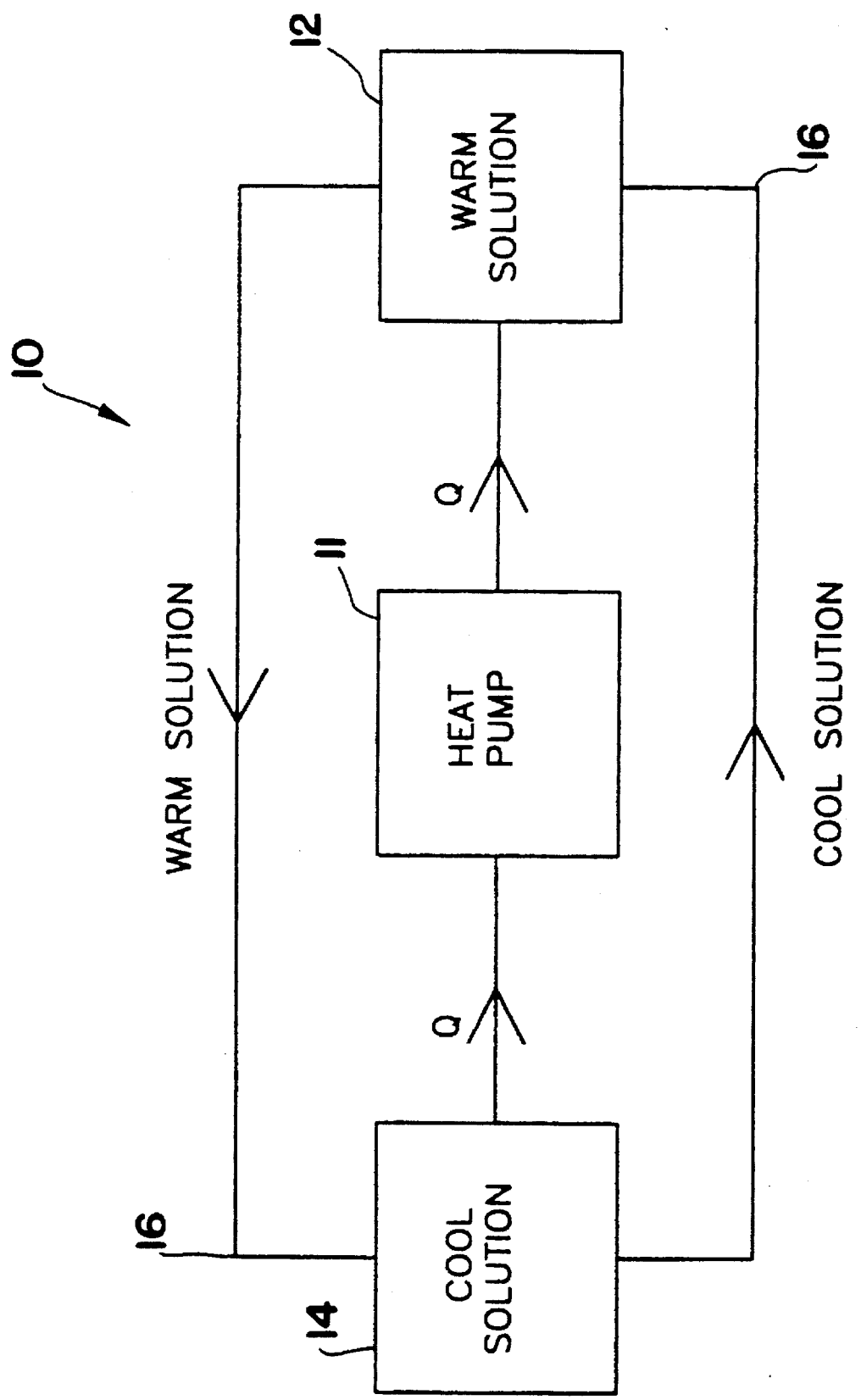
FIG. 1 is a functional schematic diagram of the apparatus of the present invention.

FIG. 1 is a functional schematic diagram of the apparatus 10 of the present invention for removing moisture from an environment. Generally, the dehumidification apparatus 10 of the present invention includes a solid state heat pump 11, such as a Peltier effect solid-state heat pump. The solid state heat pump 11 heats a chamber 12 and cools a chamber 14. Chambers 12 and 14 fluidly communicate by way of passageways which are schematically illustrated at 16. A deliquescent solution (not shown), such as a lithium chloride solution for example, fills the chambers 12, 14. The deliquescent solution is driven by convection around the circuit, as the density of the solution changes.

A thermoelectric effect is a phenomena which occurs when temperature differences exist in an electric circuit. One such thermoelectric effect is known as the Peltier effect. Briefly, if a current is passed through a metallic junction or a metal-semiconductor junction, the junction is either warmed or cooled according to the direction of flow. The Peltier effect is reversible, i.e. reversing the current causes the cool junction to become hot, and the hot junction to cool. Larger temperature differences are produced with metal-semiconductor junctions than with metal-metal junctions. As used herein, the phrase "Peltier effect solid-state heat pump" is a device which employs the Peltier effect to either heat or cool a material, such as a deliquescent solution, for example.

Figure 2:
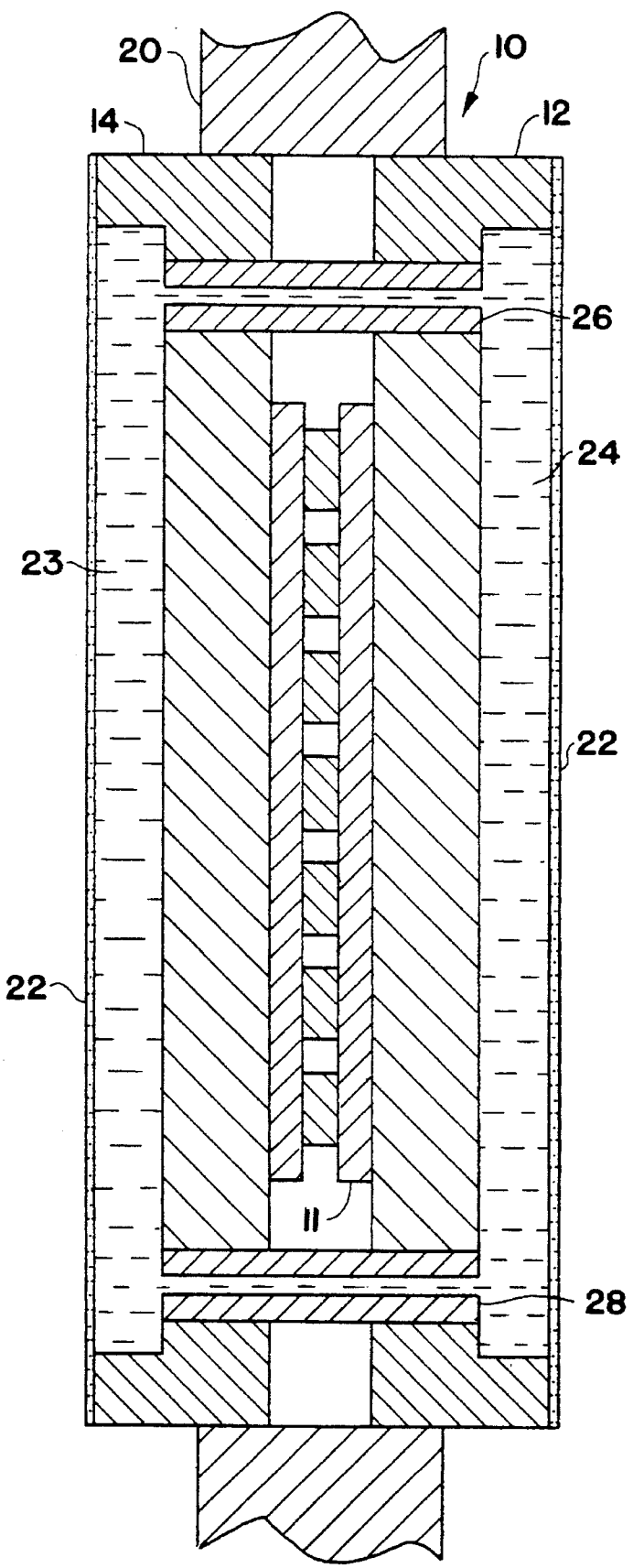
FIG. 2 is a partial cross sectional view of one embodiment of the present invention.

In one embodiment of the present invention which is illustrated in Fig. 2, an environment to be dehumidified is defined by a wall 20, which separates an internal environment from an external environment. The apparatus 10 is mounted in an aperture in the wall 20. The cool chamber 14 and the hot chamber 12 are attached, respectively, by inward-facing surfaces to the cool and hot faces of a Peltier effect solid-state heat pump 11. (A suitable Peltier effect solid-state heat pump may be purchased from Herbach & Rademan, Part No: TM92HVC2179.)

An outer-facing surface of the cool or cold chamber 14, and an outerfacing surface of the warm or hot chamber 12 is comprised of a water vapor permeable, liquid water impermeable membrane window 22, such as but not limited to porous polytetrafluoroethylene (PTFE). The porous polytetrafluoroethylene membrane used in a preferred embodiment of the present invention may be prepared by any number of known processes, but is preferably prepared by expanding PTFE as described in U.S. Pat. Nos. 4,187,390; 4,110,392; and 3,953,566 (incorporated herein by reference), to obtain expanded, porous polytetrafluoroethylene.

By "porous" it is meant that the membrane has an air permeability of at least 0.01 cubic feet per minute per square foot at 0.5 inch water gauge. The pores are micropores formed by the nodes and fibrils of the expanded PTFE.

The membrane windows 22 are attached to the respective outerfacing surfaces of the hot and cool chambers by any suitable adhesive, bonding, and/or attachment mechanism.

The cool chamber 14, with its membrane window 22, confines a cool solution of lithium chloride 23, or other suitable deliquescent or hygroscopic liquid, such that diffusion of water vapor in through the membrane window 22 allows airborne humidity in the environmental enclosure to be absorbed by the solution, which gradually dilutes the solution. Similarly, the hot chamber 12, with its membrane window 22, confines a hot solution 24, such that water vapor diffusing out through the membrane window allows excess water to be desorbed from the solution into an external atmosphere, which gradually concentrates the solution. The low temperature of the cool solution enables the solution to adsorb humidity even though the enclosure's air may be fairly cool and dry. The high temperature of the hot solution makes it desorb humidity even though the external atmosphere may be relatively warm and humid.

A tube or passage 26 joins the hot and cool chambers in an upper portion of the apparatus 10, such that solution is free to pass between the hot and cool chambers. A similar tube 28 joins the hot and cool chambers in a lower portion of the apparatus. As should be understood by reference to FIG. 2, because the hot solution is slightly less dense than the cool solution, a convection cycle occurs with the solution passing from the hot chamber 12, into the cool chamber 14, through passage 26, and from the cool chamber 14, into the hot chamber 12, through passage 28. The resultant mixing throughout the hot and cool chambers tends to minimize the diluting effect of the cool chamber adsorption, and likewise the concentrating effect of the hot chamber desorption, such that the solution concentration is similar in both chambers.

The chambers should be made from a material that is chemically resistant to the deliquescent solution used. For example, stainless steel or a suitable polymeric material are resistant to a lithium chloride solution.

The Peltier effect solid-state heat pump must be attached to the chambers 12, 14 such that the heat pump can easily pump heat from the cool chamber 14 into the hot chamber 12. Therefore, the Peltier effect solid-state heat pump should be fixedly attached to the chambers 12, 14, in thermally contacting relation, such as by use of a thermally conductive adhesive, mechanical attachment with thermal grease, or should otherwise be assembled in good and durable thermal contact.

The deliquescent solution may be any solution that equilibrates at different concentrations given different temperatures when exposed to atmospheric humidity. Salts in solution, such as lithium chloride or lithium bromide, are suitable.

The water impermeable, but water vapor permeable membrane windows 22 may be made of any suitable material having the desired permeabilities. Such materials include, but are not limited to: microporous polytetrafluoroethylene structures and substrates; polypropylene; polyamide; solid films of a polymer that has some intrinsic permeability to water molecules, such as urethane; or the materials may comprise a composite of the foregoing with support substrates such as textile materials, woven materials, nonwoven materials, porous films, and the like. The membrane windows 22 physically confine the deliquescent solution at predetermined conditions of physical state such as pressure, temperature, or concentration which exist in the sorption and desorption regions of the circuit. These conditions may include high pressure due to increased solution volume if the device is stored unpowered in a cool and damp environment. Some provision for flexing and expanding of the membrane windows 22 may be employed to improve these conditions. The ability of a membrane window 22 to confine the solution under pressure may be described by the water entry pressure of the membrane, which may be ones, tens or hundreds of pounds per square inch.

As should be understood, a large range of liquid solution volumes must be accommodated if the dehumidifier is to be robust under a variety of use and storage conditions, because the fixed amount of lithium chloride equilibrates as a solution of varying concentration according to ambient humidities. The device can be made to accommodate this wide range of volumes by suitably dimensioning the chambers, such as in the shape of an oblate cylinder, for example.

The membrane windows 22 must be permeable to the diffusion of water vapor. This permeability may be described by its Moisture Vapor Transmission Rate (MVTR). The membrane windows should have a relatively high MVTR, which may be achieved by employing a thin membrane having a high void fraction (if microporous), or being very chemically permeable to water (if solid). For a microporous membrane, MVTR may be tested by the method described in U.S. Pat No. 4,862,730 to Crosby, incorporated herein by reference.

The geometry of the fluid circuit must provide for circulation by convection given a predetermined temperature differential across the Peltier effect solid-state heat pump. In this regard, there must be a vertical range of the circuit and a height difference between at least two passages joining the chambers 12,14. Any plurality of passages having a variety of heights will allow some thermal convection, and some passage designs may render the dehumidifier more or less sensitive to orientation.

Several design parameters of the system may be chosen in appropriate balance such that overall system performance is not limited entirely by just one shortcoming. These design parameters would include flux and temperature differential of the heat pump, sorption and desorption rate of the solution at cool and warm temperatures, resistance of the circuit to solution flow, and differential height of that part of the circuit wherein density differences would give rise to convection.

Though it may be optimal to have some design differences between the hot chamber 12 and the cool chamber 14, it is also possible to have exactly the same design on hot and cool sides. The only difference, then, would be the polarity of the direct current electrical power being supplied to the Peltier effect solid-state heat pump. This polarity is easily reversed, locally or remotely, which will reverse which side of the device dehumidifies and which side releases excess humidity. Similarly, applying a larger or smaller current to the heat pump will cause a larger or smaller dehumidifying effect. Thus, the humidity transfer characteristic of the device may be continuously varied between a maximum transmission in one direction and a maximum transmission in the opposite direction. Without intending to limit the scope of the present invention, the apparatus and method of production of the present invention may be better understood by referring to the following examples:

EXAMPLE 1

One example of the apparatus of the present invention which was constructed employed a continuous circuit of porous PTFE tubes. In this embodiment, a Peltier effect solid-state heat pump was placed between two blocks which transfer heat to or from a deliquescent solution. The deliquescent solution flowed in a continuous circuit consisting of the blocks and predetermined sections of tube. The deliquescent solution traveled through the circuit by free convection. The circuit was defined by the hot chamber, the heated section of the tubes, the cool chamber, and the cool section of the tubes. Solution in the hot tubes desorbed water vapor through the tube wall, and solution in the cool tubes absorbed water through the tube wall. Water was transported from the environment surrounding the cold loop to the environment surrounding the hot loop.

The apparatus of this example comprised the following components:

two brass blocks 2"×2"×1";

Peltier effect heat pump 1.57"×1.57"×0.15"(Herbach Rademan Co. TM92HVC2179);

two expanded PTFE tubes, ½ diameter, 3.2 feet long; and approx. 300 ml of lithium chloride (LiCI) solution (40% LiCI by mass) to fill the tubes and blocks.

EXAMPLE 2

Figure 3:
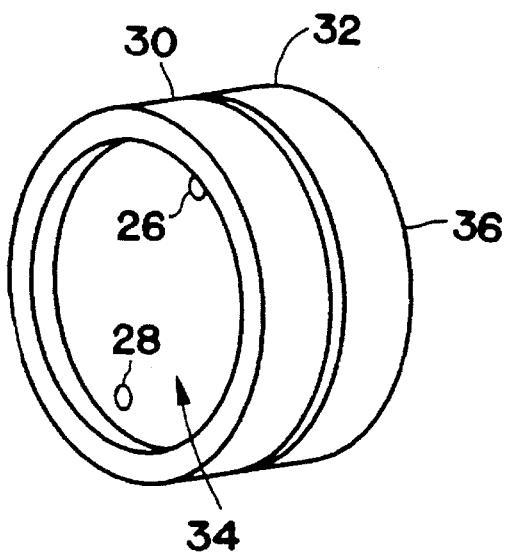
FIG. 3 is a partial perspective view of the apparatus of FIG. 2.
Figure 4:
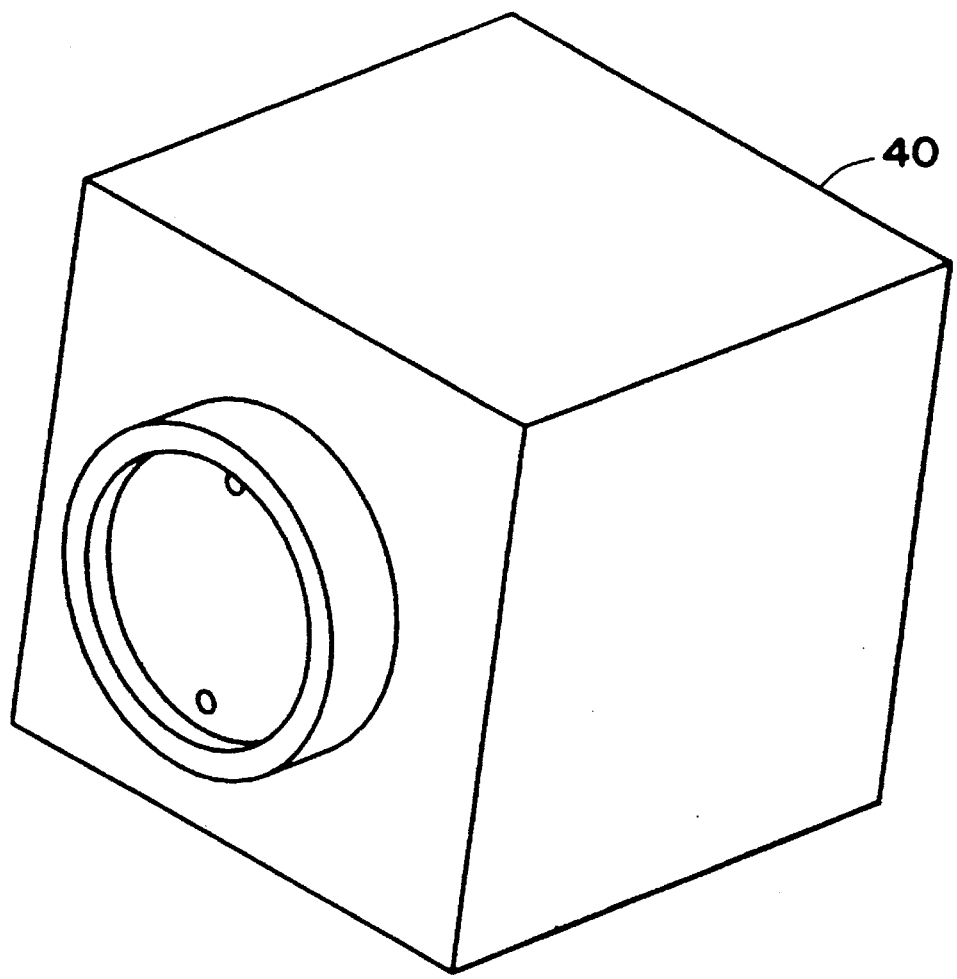
FIG. 4 is an environmental view of the apparatus of FIG. 2.
Figure 5:
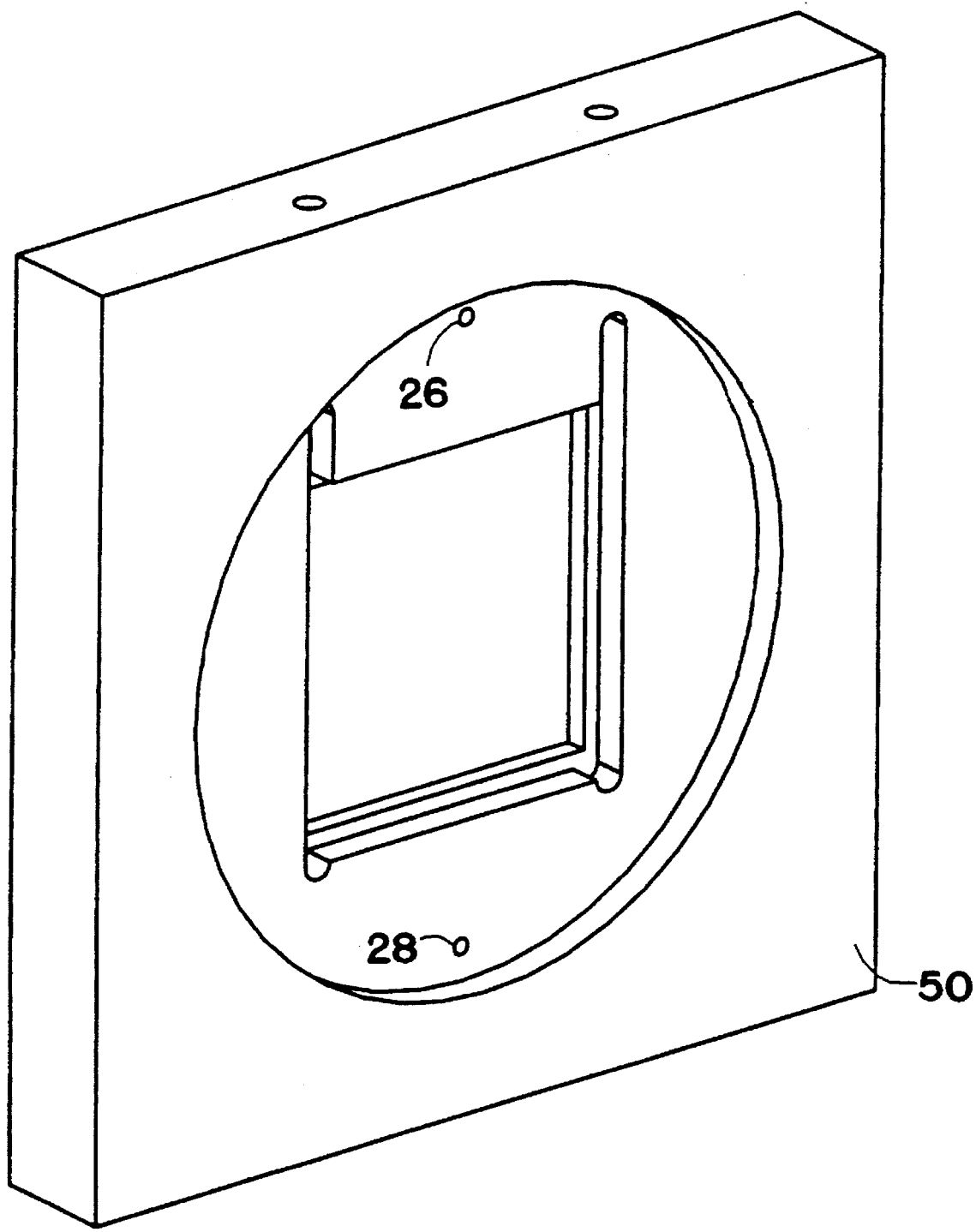
FIG. 5 is a partial perspective view of an alternate embodiment of the present invention.

An alternate embodiment of the present invention is partially illustrated in FIG. 3, and is shown mounted for operation in FIG. 4. This embodiment comprised a Peltier effect solid-state heat pump disposed between two discs 30, 32 which form cavities 34, 36 to hold a deliquescent solution. The cavities were covered with a membrane window (not shown) and were connected by tubes or passages 26, 28 for the deliquescent solution to flow therethrough. The solution traveled through the circuit by free convection. The solution was heated in the cavity 34 and rose to pass through tube 26 and into the cool cavity 34. It was cooled and sank to the bottom of the cool cavity 36 and passed into the bottom of the hot cavity, through tube 28, thereby completing the cycle. The solution on the cold side absorbed water from an enclosure 40 (FIG. 4) through the membrane, and the solution on the hot side released water through the membrane into an external environment. The net effect was the transport of water through the device.

The apparatus of this example comprised the following components:

two naval bronze discs, 3" diameter, 0.75" thick with cavities 2.5" diameter and 0.25" deep;

Peltier effect heat pump (PEHP)1.57"×1.57"×0.15" (Herbach Rademan Co. TM92HVC2179);

two pieces of Masterflex Norprene ® tubing 6404-13 to connect the two cavities;

thermal epoxy to attach one bronze disc to each side of the PEHP;

expanded PTFE membrane (Part No. 10396 W. L. Gore & Associates) for enclosing cavities; and LiCI solution (30% LiCI by mass) to fill cavities and tubes.

Figure 6:
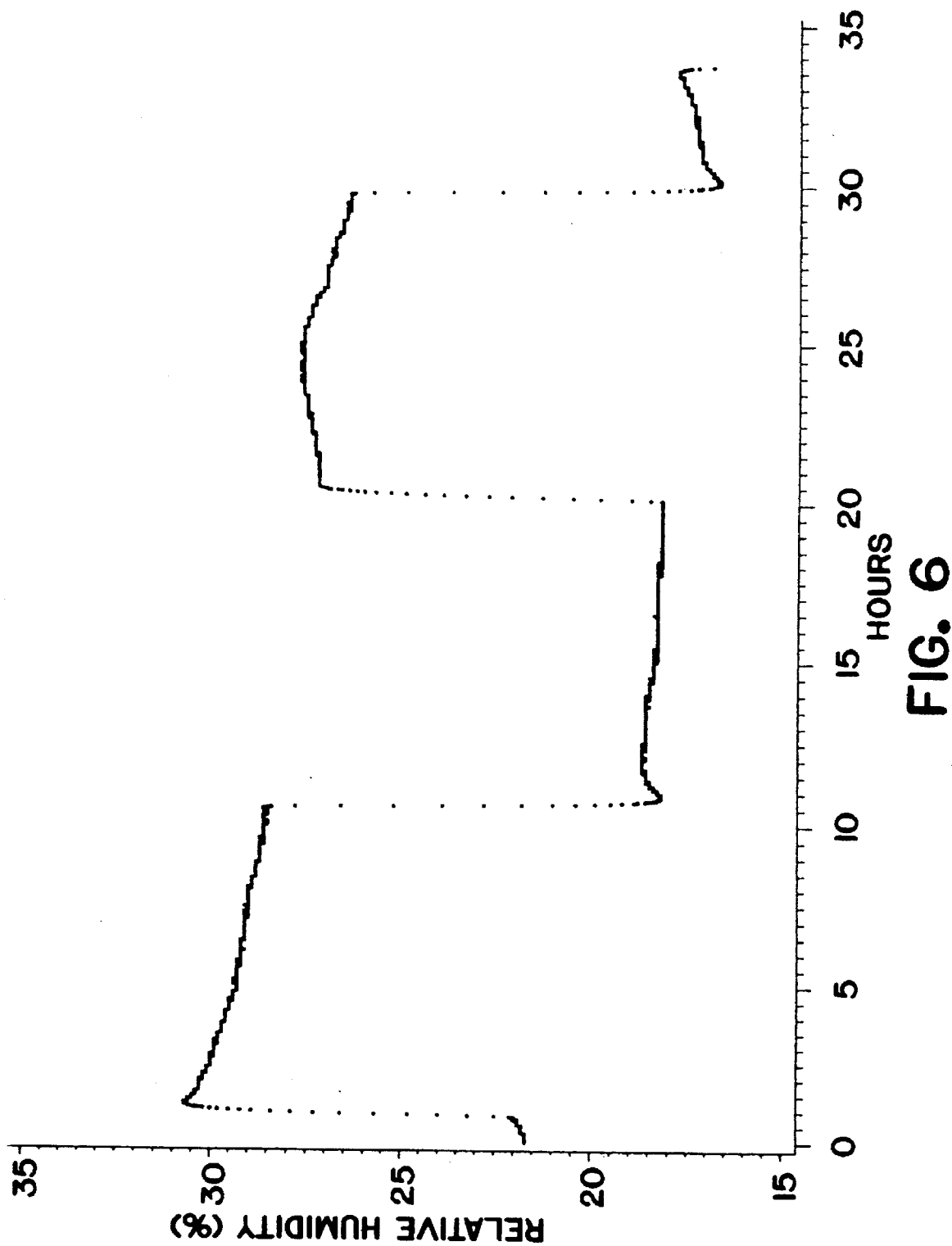
FIG. 6 is a graph of Relative Humidity v. Time, summarizing test results for an embodiment of the present invention.

This apparatus was tested by attaching the apparatus to a cylinder with volume of approximately ¾ of a liter. Inside the cylinder was an Extech HT-3001 humidity sensor attached to an external Radio Shack multimeter. Various voltages between 0.5 and 4.0 volts were applied to the Peltier effect solid-state heat pump. FIG. 6 illustrates the effect on the relative humidity inside the cylinder when the device was cyclically operated in 10 hour periods of time. Relative humidity as low as 17% was measured.

EXAMPLE 3

An alternate embodiment of the apparatus of the present invention is partially illustrated in FIG. 4. This embodiment comprised a Peltier effect solid-state heat pump (not shown) surrounded by a polycarbonate frame 50 which created a cavity on each side of the heat pump. The cavities were filled with a deliquescent solution and covered with membrane. Apertures 26, 28 through the frame 50 permit circulation of the deliquescent solution between the cavities. The apparatus of this example comprised the following components:

polycarbonate frame measuring 4"×4"×0.55";

Peltier effect solid-state heat pump 157"×1.57"×0.15" (Herbach Rademan Co. TM92HVC2179) mounted in a square shaped aperture in the polycarbonate frame;

expanded PTFE membrane (Part No. 10396 W. L. Gore & Associates) for enclosing the cavities; and a predetermined volume of LiCl solution (25%LiCl by mass) to fill the cavities. Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. An apparatus for removing moisture from an enclosed environment, the enclosed environment having a predetermined internal atmosphere, and wherein a predetermined external atmosphere surrounds the enclosed environment, the apparatus comprising:

a solid state heat pump having opposed first and second surfaces, the first surface having a predetermined temperature which is greater than a predetermined temperature of the second surface;

a support structure for mounting the solid state heat pump, the support structure defining first and second cavities, the solid state heat pump being mounted in the support structure such that the first heat pump surface thermally communicates with the first cavity and the second heat pump surface thermally communicates with the second cavity;

the support structure having formed therein at least two passages which fluidly connect the first and second cavities, the cavities and passages forming a vertical fluid circuit, wherein the first passage is disposed at a predetermined higher location than the second passage;

a deliquescent solution which fills the first and second cavities;

a first liquid water impermeable, water vapor permeable membrane; and a second liquid water impermeable, water vapor permeable membrane;

wherein the first and second membranes are attached to the support structure in liquid sealing relation to the first and second cavities, respectively, the first membrane permitting the deliquescent solution in the first cavity to desorb water vapor to the external atmosphere, and the second membrane permitting the deliquescent solution in the second cavity to adsorb water vapor from the internal atmosphere of the enclosed environment.

2. The apparatus of claim 1, wherein the solid state heat pump is a Peltier effect solid state heat pump.

3. The apparatus of claim 1, wherein the support structure is metal.

4. The apparatus of claim 1, wherein the support structure is comprised of a polymeric material.

5. The apparatus of claim 4, wherein the polymeric material is polycarbonate.

6. The apparatus of claim 1, wherein the support structure is comprised of at least first and second portions.

7. The apparatus of claim 1, wherein the first and second liquid water impermeable, water vapor permeable membranes are comprised at least in part of polytetrafluoroethylene.

8. The apparatus of claim 1, wherein the first and second liquid water impermeable, water vapor permeable membranes are comprised of porous, expanded polytetrafluoroethylene.

9. The apparatus of claim 1, wherein the first and second liquid water impermeable, water vapor permeable membranes are comprised of a material selected from a group consisting essentially of: urethane, polypropylene, and polyamide.

10. The apparatus of claim 1, wherein the first and second liquid water impermeable, water vapor permeable membranes are comprised of a solid polymeric film having an intrinsic permeability to water molecules.

11. The apparatus of claim 1, wherein each of the first and second liquid water impermeable, water vapor permeable membranes includes at least one support substrate.

12. The apparatus of claim 11, wherein the support substrate is selected from a group consisting essentially of: textile material, woven material, nonwoven material, and porous films.

13. The apparatus of claim 1, wherein the deliquescent solution is a lithium chloride solution.

14. The apparatus of claim 1, wherein the deliquescent solution is a lithium bromide solution.

\* \* \* \* \*